Oct. 24, 1933.  F. COREY  1,932,066

ALTIMETER

Filed May 6, 1930 2 Sheets-Sheet 1

INVENTOR
Flournoy Corey.
BY
ATTORNEY

Oct. 24, 1933.     F. COREY     1,932,066
ALTIMETER
Filed May 6, 1930     2 Sheets-Sheet 2
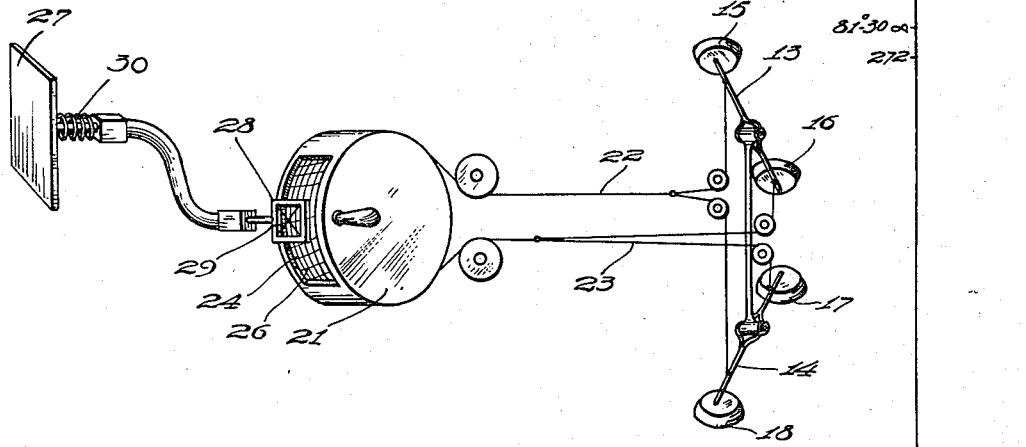
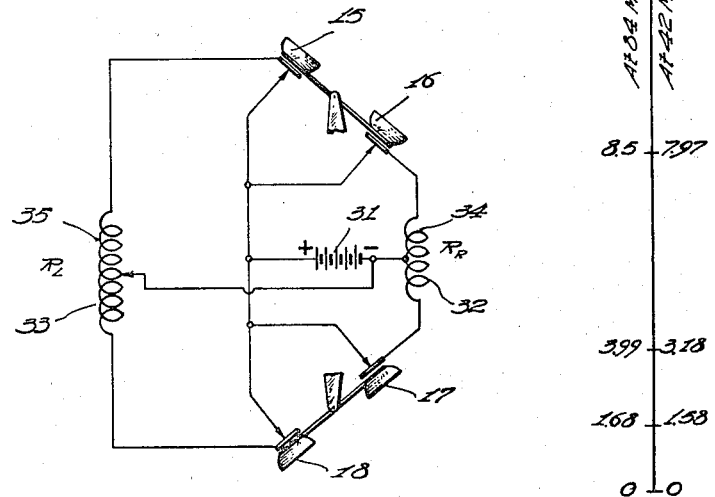
INVENTOR
Flournoy Corey.
BY
ATTORNEY Patented Oct. 24, 1933

1,932,066

UNITED STATES PATENT OFFICE 1,932,066

ALTIMETER

Flournoy Corey, Detroit, Mich., assignor to Westinghouse Electric & Manufacturing Company, a corporation of Pennsylvania Application May 6, 1930. Serial No. 450,107

8 Claims. (Cl. 177—352)

My invention relates to means for correcting the indications of one variable factor in accordance with changes in another to obtain a corrected value and it has particular application to a device for use with altimeters, such as that described in the copending application of Lewis W. Chubb, Serial No. 446,634 filed April 23, 1930 and assigned to the Westinghouse Electric & Manufacturing Company.

The device described in the Chubb application is a wave impulse-emitting device or transmitter disposed on the aircraft and which projects wave impulses, such as sound or radio waves, toward the earth below the aircraft. The wave impulses are then reflected to the aircraft, and their angle, with respect to a reference plane at the aircraft, is measured. The velocity of the aircraft is measured in any well known manner. Knowing the velocity of the aircraft in a horizontal direction and the angle, termed the angle of depression, at which the reflected waves are received, the height of the aircraft may be determined with accuracy.

In order to better understand the operation of the device, it is desirable to develop the trigonometric equation utilized in finding the height when the velocity and the angle of depression are known.

Referring more particularly to Fig. 1 of the drawings, let $L$ = the length of the fuselage of the plane between the transmitter and the receivers $t$ = the time from the emission of a wave impulse from the transmitter until the reflected impulse is received at the receiver $a$ = the velocity of sound $v$ = the velocity of the aircraft $h$ = the height to be measured $y$ = distance traveled by wave impulse from transmitter to the earth or from earth to the receiver.

$\phi$ = the angle of depression, and $2D$ = length of airplane + distance travelled while sound goes to earth and returns to receiver then $$D = \frac{L+vt}{2}$$

(1) $\therefore \cot \phi = \frac{D}{h} = \frac{L+vt}{2h}$ again, $$2y = at$$

$$\sin \phi = \frac{h}{y}$$

(2) $\therefore \sin \phi = \frac{2h}{at}$

Cross multiplication of (1) and (2) gives (3) $2h \cot \phi - L = vt$ (4) $\frac{\sin \phi}{2h} = \frac{1}{at}$ Simplification of (3) and (4) gives (5) $2ah \cot \phi - aL = avt$ (6) $\frac{\sin \phi}{2vh} = \frac{1}{avt}$ Therefore by substitution in (6) of (5) we have (7) $\frac{1}{2ah \cot \phi - aL} = \frac{\sin \phi}{2vh}$ by cross multiplication of (7) we obtain (8) $2vh = 2ah \sin \phi \cot \phi - \sin \phi aL$ but:—

(9) $\cot \phi = \frac{\cos \phi}{\sin \phi}$

Therefore

(10) $2vh = 2ah \cos \phi - \sin \phi aL$

Simplifying (10) we obtain:—

(11) $2vh - 2ah \cos \phi = -\sin \phi aL$ or

(12) $h(2v - 2a \cos \phi) = -\sin \phi aL$ or

(13) $h = \frac{\sin \phi \cdot aL}{2a \cos \phi - 2v}$

It can, therefore, be understood that, knowing the velocity of the aircraft and the angle of depression $\phi$ the altitude of the aircraft can readily be ascertained.

It will be seen that the Chubb equation is based on the velocity of the aircraft with respect to the ground or "ground speed". Since it is difficult to obtain a direct reading meter for ground speed, I prefer to utilize an air-speed meter to measure the velocity factor of the Chubb equation. This gives rise to slight inaccuracies which do not become of sufficient magnitude to make the readings unusable.

My invention has, for one of its objects, the provision of a means for superimposing one variable factor upon another to obtain a correct value.

Another object of my invention is to provide a device which automatically correlates the variable factors of air speed and angle of reflected sound so that the operator can read the altitude directly from a scale.

Another object of my invention is to provide a device which permits the combination of an altimeter with an air-speed meter.

Still other objects of my invention will become apparent from the following description, taken in conjunction with the drawings.

Referring to the drawings, in which like figures indicate like parts:

Fig. 4 is a diagrammatic view of the control system utilized in ascertaining the angle at which the reflected sounds are received, and also of the device utilized in combining the readings of the angle-measuring device and an air-speed meter.

Fig. 5 is a diagram of the control circuit employed, and

Fig. 6 is a graph showing the relation between indicated altitude readings at two different air speeds.

While my device is particularly useful in conjunction with a depth-sounding device or an altimeter, such as is shown in the Chubb application, it is apparent that the device may be readily utilized whenever it is necessary to correct one set of indications in accordance with another set of factors.

In the Chubb invention, a wave-impulse-emitting device or transmitter is provided on the aircraft to project the wave impulses, such as sound or radio waves, toward the earth below the aircraft. These waves are sent out in all directions but, of course, only one given set of reflected impulses are received at the aircraft. Owing to the movement of the aircraft through the air and the distance from the transmitter to the receiving elements, the waves, reflected from the earth below, are received at an angle, with regard to a horizontal plane, which varies in accordance with variations in the altitude of the aircraft. The velocity of the aircraft is preferably measured by an air-speed indicator which gives rise to certain inaccuracies since the Chubb equation is based on ground speed, but the inaccuracies are negligible. Knowing the air speed of the aircraft, and the angle, termed the angle of depression, at which the reflected waves are received, the height of the aircraft may be determined with reasonable accuracy.

Since the angle of depression changes more rapidly as the aircraft approaches the earth, the altitude of the aircraft may be determined to a greater degree of accuracy when the aircraft is close to the earth's surface.

In applying the device to an aircraft, such as an airplane, for instance, it is preferable to mount the wave-impulse-emitting device near the rear of the fuselage where it is out of the way and is less subject to the influence of the motor and the propeller. The wave-impulse-receiving device, such as the microphones shown, are preferably mounted below the wing, for a reason to be hereinafter explained.

Figure 1:
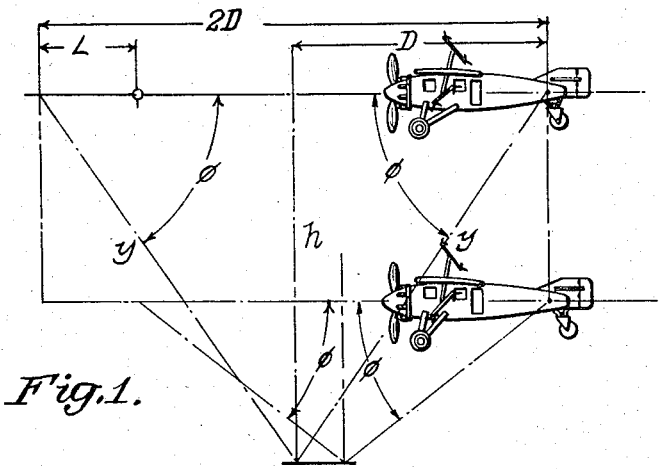
Figure 1 is a diagram illustrating how wave impulses sent from the aircraft and reflected from the ground are received at different angles, with reference to a horizontal plane, in accordance with changes in altitude.
Figure 2:
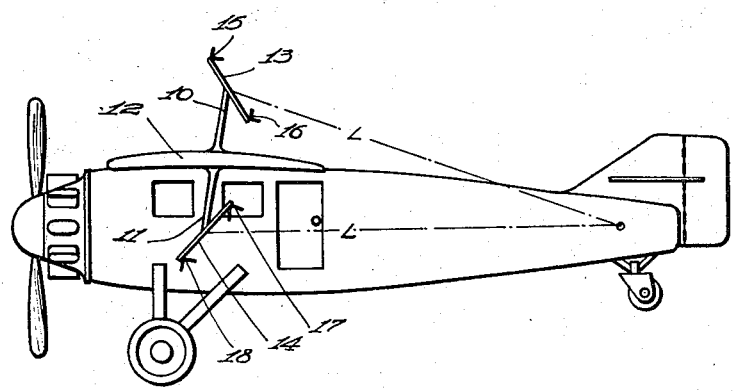
Fig. 2 is a side elevational view of an airplane having an altitude-indicating device incorporated in the structure.

With particular reference to Fig. 2 of the drawings, two arms 10 and 11 are provided, one above and one below a horizontally extending air foil, such as the wing 12 of the airplane. Levers 13 and 14 are pivotally mounted on the ends of the arms in such manner that the levers may be oscillated in a vertical plane parallel to the direction of flight of the aircraft. The levers are pivotally mounted at their centers and carry microphones 15, 16, 17 and 18, at their ends. The control system for moving the levers and the microphones is shown schematically in Fig. 4. It is to be noted that the levers are to be moved simultaneously in opposed relation to each other so that, for instance, while the lower lever 14 is at a given positive angle with reference to a plane equally distant from the ends of the arms, the upper lever 13 is at an equal negative angle with reference to the plane. Control of the levers and the position of the microphone is secured by means of a combined control and indicating device, such as the pulley 21 shown in Fig. 4. The controls, as exemplified by the cords 22 and 23, are adapted to be moved simultaneously in opposite directions by the pulley 21 to which the cords are fastened.

Figure 3:
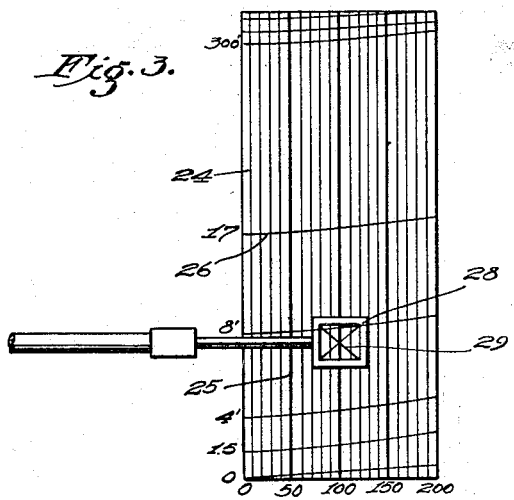
Fig. 3 is an enlarged plan view of the dial shown in Fig. 4.

The pulley is provided with an axially extending scale 24, as shown in Figs. 3 and 4, which has vertically extending divisions 25 for indicating air speed and horizontally extending divisions 26 for indicating altitudes.

An air-speed meter of the usual type, as, for instance, a Venturi meter or a wind plate 27, is mounted on the airplane at a position such that it is moved against the force of the calibrated spring 30 only by the pressure created by the forward movement of the aircraft, thereby causing a pointer 28 to move horizontally across the scale of the pulley 21, in accordance with the air speed, so that the cross lines 29 indicate, on the vertical lines 25, the air speed of the aircraft, and, when the microphones have been properly adjusted, to indicate the angle of depression, the pulley scale 24 has been moved underneath the hair lines of the pressure-indicating device to indicate the altitude of the aircraft, with values for the air speed of the aircraft superimposed upon the value of the angle of depression.

It is to be understood that the control device has been shown diagrammatically only and any suitable mechanism may be employed without departing from the spirit and scope of the invention, as expressed in the claims.

Referring more particularly to Fig. 5, the two microphones 17 and 18, disposed below the wings, are connected in parallel electrical relation to the power supply 31 and each microphone is connected in series electrical relation to portions 32 and 33 of the opposed windings of the receivers $R_L$ and $R_R$, respectively. The two microphones 15 and 16, disposed above the wing, are connected in parallel electrical relation to each other and to the two lower microphones across the terminals of the power supply 31, but each of the upper microphones is connected in series electrical relation to other portions 34 and 35 of the receiver windings $R_R$ and $R_L$, respectively. The receivers $R_L$ and $R_R$ are the usual receivers employed in binaural searching circuits, and one receiver $R_R$ is applied to the right ear and the other $R_L$ to the left ear.

In determining the altitude of the aircraft, the operator adjusts the position of the microphones 17 and 18, by means of the pulley 21, until the sound of the advancing reflected wave fronts seems to be in the middle of his head. This means that the microphones 17 and 18 are being simultaneously affected by the advancing wave fronts and are, therefore, parallel to them. The pointer 28 of the air-speed meter 27 moves across the scale to the pulley 21 from left to right and right to left in accordance with the air speed, as actuated and controlled by the air-speed meter. The scale shown in Figs. 3 and 4 is devised by plotting air-speed as abscissæ and altitude as ordinates. Fig. 6 illustrates graphically the difference in height readings at air speeds of 42 and 84 miles per hour.

The hair lines 29 of the indicator, therefore, show directly the altitude of the aircraft by reason of the angle made by the lever arm 14 with respect to a given reference plane, such as the horizontal plane of the aircraft and corrected with reference to the air speed of the aircraft.

The microphones 15 and 16, of course, move in synchronism with the microphones 17 and 18 except that their movement is in the opposite direction. Microphones 15 and 18, for instance, will be located at substantially the same distance from the transmitter, the motor and the propeller, at all times and, therefore, sound coming direct from the transmitter, the motor and propeller will energize the windings 33 and 35 of the receiver $R_L$ in opposite directions so that the effect of sounds travelling in a horizontal direction is balanced out by means of the electrical impulses which act against each other.

The same is true of microphones 16 and 17 with respect to the receiver windings 34, and 32 of receiver $R_R$, and a sound wave which strikes microphones 16 and 17 will cause an equal and opposite electrical disturbance in the receiver $R_R$ which will balance out.

The horizontally extending wing 12 acts to shield the upper set of microphones and, therefore, the reflected sound from the ground below will affect only the microphones 17 and 18. The operator, as has been explained, may move the microphones until the sound in the receivers seems to be in the center of the head, by reason of the well known binaural phenomena, and he can then read from the indicating device, by my invention, the height of the aircraft corrected for air speed.

It is to be noted that the crossed hair lines of the indicating device also may be utilized to ascertain the air speed of the aircraft, since the indicator moves from left to right and right to left directly in accordance with the air speed and the scale below the indicator is divided vertically into units of speed in miles per hour.

In view of the foregoing, it will be apparent that the invention provides for giving the pilot of an aircraft a direct indication of his height above the earth with a reasonable and safe degree of accuracy. The accuracy of the indication is more than sufficient for all practical purposes when all of the factors giving rise to the slight inaccuracy are taken into consideration.

As pointed out hereinbefore, the slight error due to the use of air speed instead of ground speed is negligible because of the small variation or change in the altitude readings for different velocities of the aircraft, as shown in Fig. 6.

There may be also some slight inaccuracy of the indication because of the sound waves being carried by the wind, but, since the wind velocity is usually so low in comparison to the speed at which the sound waves travel, this cause of inaccuracy becomes purely theoretical and of no consequence.

Any slight inaccuracy occurring because of changes in air density at different altitudes, thereby causing some slight variation in pressure on the air speed indicator, may be also eliminated to a substantial degree by utilizing the average pressure and designing or calibrating the indicating device for this pressure.

It is apparent that modifications may be made by those skilled in the art and such modifications may be made without departing from the spirit and scope of my invention, as set forth in the appended claims.

I claim as my invention:

1. In combination with an aeroplane, means carried by the aeroplane for emanating sound waves to be reflected from the earth, means carried by the aeroplane for receiving the reflected sound waves, means for adjusting the position of the receiving means in accordance with the angle of reflection of the sound waves, said adjusting means including a device for indicating the apparent height of the aeroplane above the earth, and means responsive to the air speed of the aeroplane for correcting the reading of the indicating device in accordance with the air speed of the aeroplane.

2. The combination of an aircraft, means carried by the aircraft for emitting sound waves to be reflected from the earth while the aircraft is in flight, wave receiving means carried by the aircraft for receiving the reflected waves, means including a scale for adjusting the wave receiving means to measure the angle of reflection of the waves and indicate the angle on the scale, and means including an index pointer responsive to the air speed of the moving aircraft for cooperating with the scale whereby the angle of reflection which is proportional to the altitude of the aircraft is corrected for air speed.

3. The combination of an aircraft, means carried by the aircraft for emitting sound waves to be reflected from the earth while the aircraft is in flight, wave receiving means carried by the aircraft for receiving the reflected waves, means for adjusting the wave receiving means in accordance with the angle of depression of the sound waves, a scale provided with an index pointer which is stationary with respect to the direction of movement of the scale and movable in a direction at right angles to the direction of movement of the scale, said scale being actuated in accordance with the movement of the wave receiving means and disposed to indicate the altitude of the aircraft, and means responsive to the air speed of the aircraft for actuating the index pointer, thereby to indicate directly the altitude of the aircraft at any particular air speed.

4. In combination with an aircraft, means on the aircraft for transmitting sound waves to be reflected by the earth, means including a pair of sound detectors mounted on a movable supporting member for measuring the angle of depression of the sound waves, means for adjusting the movable supporting member to an angular position corresponding to the angle of depression, a device responsive to the air speed of the aircraft, and an indicating device disposed to be jointly actuated in accordance with the adjusting means, sound detectors and their supporting member and the device responsive to the air speed for indicating the height of the aircraft above the earth.

5. In combination with an aircraft, means on the aircraft for transmitting sound waves to be reflected by the earth, means including a pair of sound detectors mounted on a movable supporting member for measuring the angle of depression of the sound waves, means for adjusting the movable supporting member to an angular position corresponding to the angle of depression, a device responsive to the air speed of the aircraft, and a device for indicating the height of the aircraft above the earth, said device having a movable element provided with a scale which is actuated in accordance with the movement of the sound detectors and their supporting member and a pointer disposed to be moved across the scale at right angles to the direction of movement of the scale, said pointer being actuated by the air speed responsive device.

6. In combination with an aircraft, means on the aircraft for transmitting sound waves to be reflected by the earth, means including a pair of sound detectors mounted on a movable supporting member for measuring the angle of depression of the sound waves, means including a drum element for adjusting the position of the supporting member for the sound detectors, said drum being provided with a scale having reference lines indicating distance above the earth and intersecting reference lines indicating air speed, an index pointer associated with the drum element and movable only in a direction at right angles to the direction of movement of the drum element, and means responsive to the air speed of the aircraft for controlling the movement of the index pointer.

7. In combination with an aircraft, means upon the aircraft for producing sound waves, a plurality of pairs of electrically-connected sound detectors mounted on the aircraft, means for simultaneously rotating the pairs of sound detectors to maintain them symmetrically disposed relative to the means for producing sound waves, receiver means connected to the sound detectors in a predetermined manner whereby the operator may determine the position to which the sound detectors are to be rotated, a scale associated with the means for rotating the sound detectors disposed to indicate the altitude of the aircraft as determined by the angle of depression of the reflected sound waves, an index pointer associated with the scale and disposed to be moved across the scale at right angles to its direction of movement, and means movable in proportion to the air speed for adjusting the position of the index pointer, thereby to provide a direct indication of the altitude of the aircraft in accordance with its air speed.

8. In combination with an aircraft, means upon the aircraft for emitting sound waves, means, including a movable member, upon the aircraft to measure the angle between the sound beam reflected from the earth and the axis of the aircraft, a scale, means operated by the movable member to move the scale in a predetermined relation to the motion of the movable member, an index pointer disposed to cooperate with the scale, and means to move the index pointer in a direction at right angles to the direction of movement of the scale, means movable in proportion to the air speed of the aircraft, and means for moving the index means by the air speed means.

FLOURNOY COREY.